United States Patent
Muramatsu et al.

(10) Patent No.: US 11,521,649 B2
(45) Date of Patent: Dec. 6, 2022

(54) METHOD OF PRODUCING A MAGNETIC POWDER AND METHOD OF PRODUCING A MAGNETIC RECORDING MEDIUM

(71) Applicant: SONY CORPORATION, Tokyo (JP)

(72) Inventors: Atsushi Muramatsu, Miyagi (JP); Masafumi Nakaya, Miyagi (JP); Masaru Terakawa, Miyagi (JP); Satoru Abe, Miyagi (JP); Natsuki Toyosawa, Miyagi (JP); Katsunori Maeshima, Miyagi (JP)

(73) Assignee: Sony Corporation, Tokyo (JP)

(*) Notice: Subject to any disclaimer, the term of this patent is extended or adjusted under 35 U.S.C. 154(b) by 784 days.

(21) Appl. No.: 16/330,010

(22) PCT Filed: Sep. 27, 2017

(86) PCT No.: PCT/JP2017/034973
§ 371 (c)(1),
(2) Date: Mar. 1, 2019

(87) PCT Pub. No.: WO2018/088050
PCT Pub. Date: May 17, 2018

(65) Prior Publication Data
US 2021/0287714 A1    Sep. 16, 2021

(30) Foreign Application Priority Data
Nov. 11, 2016   (JP) .............................. JP2016-220999

(51) Int. Cl.
*G11B 5/714* (2006.01)
*C01G 49/06* (2006.01)
(Continued)

(52) U.S. Cl.
CPC .............. *G11B 5/714* (2013.01); *C01G 49/06* (2013.01); *G11B 5/653* (2013.01);
(Continued)

(58) Field of Classification Search
CPC ......... C01G 49/06; H01F 1/0045; H01F 1/11; H01F 1/112; G11B 5/842; B82Y 25/00;
(Continued)

(56) References Cited

U.S. PATENT DOCUMENTS 9,330,821 B2 * 5/2016 Tilley .................... B82Y 25/00
11,031,034 B2 * 6/2021 Terakawa ............... G11B 5/712
(Continued)

FOREIGN PATENT DOCUMENTS

JP   2008-100871 A   5/2008
JP   2011-032496 A   2/2011
(Continued)

OTHER PUBLICATIONS

International Search Report and Written Opinion issued in connection with International Patent Application No. PCT/JP2017/034973, dated Dec. 26, 2017. (10 pages).

(Continued)

*Primary Examiner* — C Melissa Koslow
(74) *Attorney, Agent, or Firm* — K&L Gates LLP

(57) ABSTRACT

A method of producing a magnetic powder includes: performing heat treatment on first particles that contain triiron tetraoxide to prepare second particles that contain ε-iron oxide.

8 Claims, 10 Drawing Sheets

(51) Int. Cl.
- *G11B 5/65* (2006.01)
- *G11B 5/842* (2006.01)
- *H01F 1/00* (2006.01)
- *H01F 1/06* (2006.01)
- *H01F 1/11* (2006.01)
- *G11B 5/712* (2006.01)
- *G11B 5/706* (2006.01)
- *B82Y 25/00* (2011.01)
- *B82Y 40/00* (2011.01)

(52) U.S. Cl.
CPC .......... *G11B 5/70642* (2013.01); *G11B 5/712* (2013.01); *G11B 5/842* (2013.01); *H01F 1/0045* (2013.01); *H01F 1/06* (2013.01); *H01F 1/11* (2013.01); *H01F 1/112* (2013.01); *B82Y 25/00* (2013.01); *B82Y 40/00* (2013.01); *C01P 2004/64* (2013.01); *C01P 2004/84* (2013.01); *C01P 2006/42* (2013.01)

(58) Field of Classification Search
CPC ... B82Y 40/00; C01P 2004/64; C01P 2006/42
See application file for complete search history.

(56) References Cited

U.S. PATENT DOCUMENTS

| | | |
|---|---|---|
| 2014/0085023 A1 | 3/2014 | Takahashi et al. |
| 2017/0287516 A1 | 10/2017 | Sakane et al. |
| 2019/0096551 A1* | 3/2019 | Naoi .................. G11B 5/712 |

FOREIGN PATENT DOCUMENTS

| | | |
|---|---|---|
| JP | 2012-212807 A | 11/2012 |
| JP | 2012-231098 A | 11/2012 |
| JP | 2016-174135 A | 9/2016 |
| JP | 2017-201672 | 11/2017 |
| JP | 2017-201672 A | 11/2017 |
| JP | 2017/2061672 | * 11/2017 |

OTHER PUBLICATIONS

Shunsuke Sakurai, et al., Reorientation Phenomenon in a Magnetic Phase of e-Fe2O3 Nanocrystal, Journal of the Physical Society of Japan, vol. 74, No. 7, Jul. 2005, pp. 1946-1949.

* cited by examiner

A

B

C

D

METHOD OF PRODUCING A MAGNETIC POWDER AND METHOD OF PRODUCING A MAGNETIC RECORDING MEDIUM

CROSS-REFERENCE TO RELATED APPLICATIONS

The present application claims the benefit of International Application No. PCT/JP2017/034973, filed Sep. 27, 2017, which claims priority to Japanese Application No. 2016-220999, filed Nov. 11, 2016, the disclosures of which are incorporated herein by reference.

BACKGROUND

The present technology relates to a method of producing a magnetic powder and a method of producing a magnetic recording medium.

$\varepsilon$-iron oxide ($\varepsilon$-Fe$_2$O$_3$) is expected to be applied to a magnetic recording material of a coating-type magnetic recording medium. As a method of producing $\varepsilon$-iron oxide, for example, the following methods have been proposed.

In Patent Literature 1, a method of producing $\varepsilon$-Fe$_2$O$_3$ crystal including a heat treatment step A of producing cubic iron oxide by performing heat treatment on particles of iron oxyhydroxide ($\alpha$-FeOOH) in a temperature range of 300 to 600° C. in a weakly reducing atmosphere such as a hydrogen gas atmosphere in which water vapor is mixed, and a heat treatment step B of generating $\varepsilon$-Fe$_2$O$_3$ crystal from the cubic iron oxide by performing heat treatment on the particles obtained in the heat treatment step A in a temperature range of 700 to 1300° C. in an oxidizing atmosphere such as the atmosphere has been proposed.

In Non-Patent Literature 1, a method of producing $\varepsilon$-iron oxide particles by preparing iron hydroxide-based compound particles by a reverse micelle method, subjecting the particles to silica coating, and then performing heat treatment thereon has been proposed.

SUMMARY

Technical Problem

However, in the $\varepsilon$-iron oxide obtained by the above-mentioned production method, there is a possibility that variation in particle size is large. In the case of preparing a magnetic recording medium by using $\varepsilon$-iron oxide having large variation in particle size, there is a possibility that the magnetic properties of the magnetic recording medium are deteriorated.

It is an object of the present technology to provide a method of producing a magnetic powder and a method of producing a magnetic recording medium that are capable of suppressing variation in particle size of particles containing $\varepsilon$-iron oxide.

Solution to Problem

In order to solve the above-mentioned problem, a first technology is a method of producing a magnetic powder, including: performing heat treatment on first particles that contain triiron tetraoxide to prepare second particles that contain $\varepsilon$-iron oxide.

A second technology is a method of producing a magnetic recording medium, including: performing heat treatment on first particles that contain triiron tetraoxide to prepare second particles that contain s-iron oxide; and forming a recording layer by using the prepared second particles.

Advantageous Effects of Invention

In accordance with the present technology, it is possible to suppress variation in particle size of particles containing $\varepsilon$-iron oxide. It should be noted that the effect described here is not necessarily limitative and may be any effect described in the present disclosure or an effect different from them.

DETAILED DESCRIPTION

Figure 1:
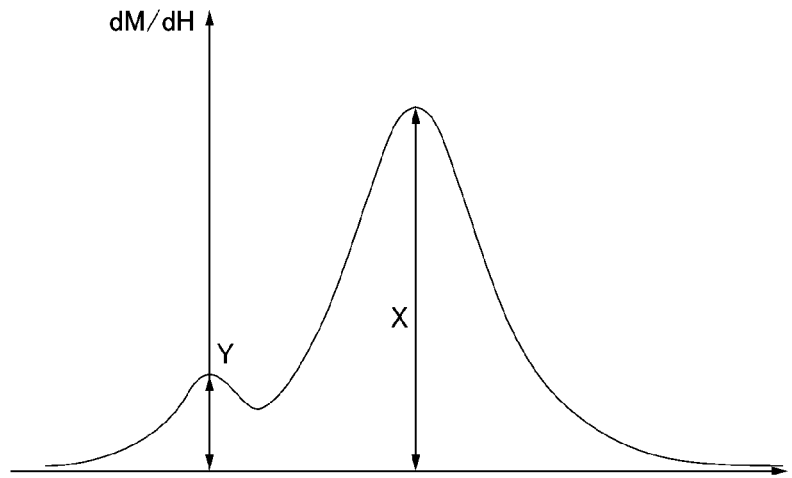
FIG. 1 is a graph showing an example of an SFD curve.

Embodiments of the present technology will be described in the following order.
1 First Embodiment (Example of Magnetic Powder)
2 Second Embodiment (Example of Magnetic Powder)
3 Third Embodiment (Example of Magnetic Powder)
4 Fourth Embodiment (Example of Magnetic Recording Medium)

1 First Embodiment

[Configuration of Magnetic Powder]

A magnetic powder according to a first embodiment of the present technology contains a powder of nanoparticles containing ε-iron oxide (hereinafter, referred to as "ε-iron oxide particles"). The magnetic powder according to the first embodiment is suitable for use as a recording layer (magnetic layer) of a magnetic recording medium having high density. The ε-iron oxide particles each have, for example, a substantially cubic shape or a substantially spherical shape. It is favorable that the ε-iron oxide contained in ε-iron oxide particles has s-$Fe_2O_3$ crystal (including those in which a part of the Fe site is substituted with a metal element M) as the main phase. It is more favorable that the ε-iron oxide is formed of s-$Fe_2O_3$ in a single phase. The metal element M represents, for example, one or more selected from the group consisting of Al, Ga, and In. However, when the molar ratio of M and Fe in the iron oxide is expressed as M:Fe=x:(2-x), $0 \leq x < 1$.

In the present technology, the ε-$Fe_2O_3$ crystal includes, unless otherwise specified, crystal in which a part of the Fe site is substituted with a trivalent metal element M and the space group is the same as that of pure ε-$Fe_2O_3$ crystal (i.e., the space group is $Pna2_1$) in addition to pure ε-$Fe_2O_3$ crystal in which the Fe site is not substituted with another element.

(Average Particle Size)

An average particle size $D_{ave}$ of the magnetic powder is favorably not less than 8 nm and not more than 25 nm, and more favorably not less than 12 nm and not more than 20 nm. In the case where the average particle size $D_{ave}$ of the magnetic powder is less than 8 nm, it is difficult for the particles to disperse, which may deteriorate C/N. Meanwhile, in the case where the average particle size $D_{ave}$ of the magnetic powder exceeds 25 nm, there is a possibility that it is difficult to achieve high recording density.

The average particle size $D_{ave}$ of the magnetic powder described above is obtained as follows. First, a magnetic powder is imaged by using a transmission electron microscope (TEM). Next, 500 ε-iron oxide particles are randomly selected from the TEM image, and the area S of each particle is obtained. Next, assuming that the cross-sectional shape of the particle is circular, the particle diameter (diameter) R of each particle is calculated as particle size on the basis of the following formula to obtain the particle size distribution of the magnetic powder.

$$R = 2 \times (S/\pi)^{1/2}$$

Next, the median diameter (50% diameter, D50) is obtained from the obtained particle size distribution, and this is taken as an average particle size $D_{ave}$.

(Coefficient of Variation)

A coefficient of variation of the magnetic powder represented by the following formula (1) is not more than 30%.

Coefficient of variation[%]=([Standard deviation of particle size]/[Average particle size])×100   (1)

When the coefficient of variation exceeds 30%, the variation in particle size of ε-iron oxide particles becomes large, and there is a possibility that variation in magnetic properties of the magnetic powder becomes large.

The coefficient of variation of the above-mentioned magnetic powder is obtained as follows. First, the particle size distribution of the magnetic powder is obtained in the same way as that of the above-mentioned method of calculating the average particle size. Next, the median diameter (50% diameter, D50) is obtained from the obtained particle size distribution, and this is taken as the average particle size $D_{ave}$. Further, a standard deviation σ is obtained from the obtained particle size distribution. Next, $\sigma/D_{ave}$ is calculated from the obtained average particle size $D_{ave}$ and the standard deviation σ of the particle size distribution, and this is calculated as a coefficient of variation.

(SFD)

In the SFD (Switching Field Distribution) curve of the magnetic powder, the ratio Y/X of a sub-peak height Y near the zero magnetic field to a main peak height X is not more than 0.5 (see FIG. 1). When the ratio Y/X exceeds 0.5, variation in particle size of the ε-iron oxide particles becomes large, and there is a possibility that variation in magnetic properties of the magnetic powder becomes large.

The above-mentioned ratio Y/X is obtained as follows by using a vibrating sample magnetometer (VSM) or superconducting quantum interference device (SQUID). First, the magnetic powder is sampled into a predetermined form. The format of the sampling, e.g., consolidation to a measurement capsule and pasting to a measurement tape, can be freely performed within a range that does not affect the measurement. Next, the M-H loop of the magnetic powder sample is measured, and an SFD curve is calculated from the obtained M-H curve. For the calculation of the SFD curve, a program attached to a measurement device may be used, or another program may be used. Here, the measurement of the M-H loop is performed at room temperature (23° C.). The ratio Y/X is calculated by regarding the absolute value of the point where the obtained SFD curve crosses the Y axis (dM/dH) as "Y" and the main peak height seen in the vicinity of a coercive force Hc in the M-H loop as "X".

[Method of Producing Magnetic Powder]

Figure 2:
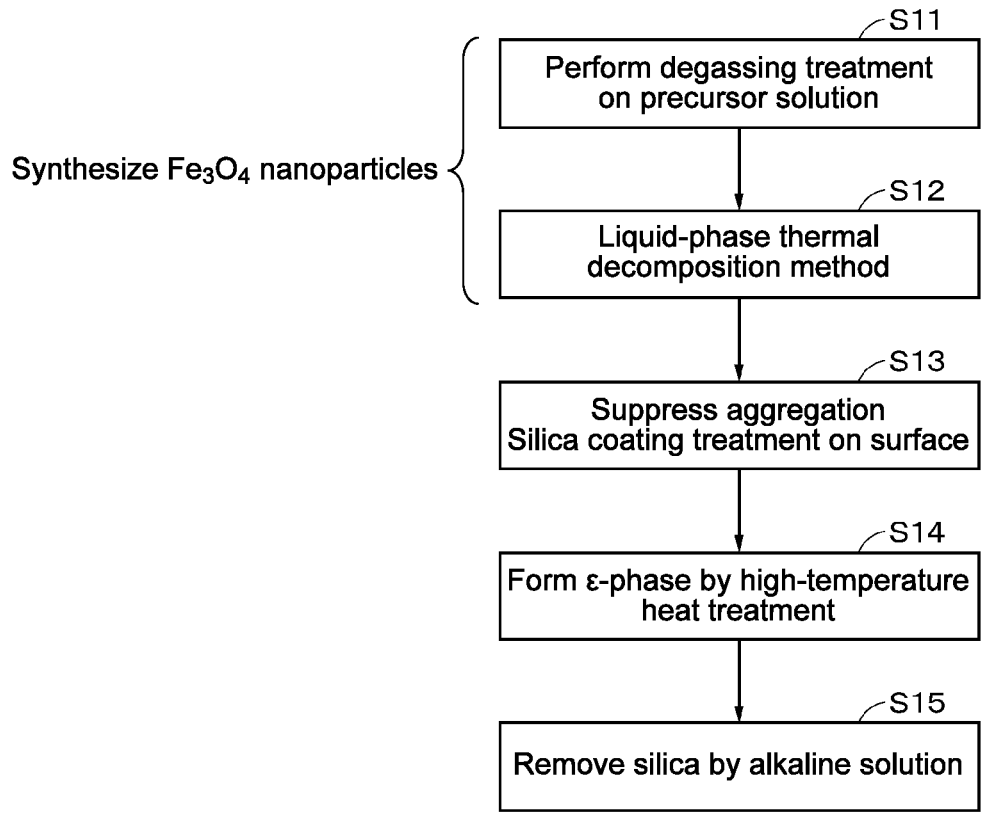
FIG. 2 is a process chart for describing a method of producing a magnetic powder according to a first embodiment of the present technology.

Hereinafter, a method of producing the magnetic powder according to the first embodiment of the present technology will be described with reference to FIG. 2 and Parts A to D of FIG. 3. In the method of producing the magnetic powder, a powder of ε-iron oxide particles is synthesized by using a powder of nanoparticles containing $Fe_3O_4$ (triiron tetraoxide) (hereinafter referred to as "$Fe_3O_4$ particles") as a starting raw material.

(Degassing Treatment)

First, in Step S11, iron acetylacetonate is mixed with a solvent to prepare a precursor solution, and then degassing treatment is performed on the precursor solution. As the solvent, those functioning also as ligands are used, and oleic acid and oleylamine are favorable. This is because $Fe_3O_4$ particles with less aggregation can be synthesized, so that a powder of $Fe_3O_4$ particles 11a having sharp particle size distribution can be obtained. As the concentration of iron acetylacetonate in the precursor solution, the size of $Fe_3O_4$ particles as precursor particles can be increased.

Although the method of the degassing treatment is not particularly limited, a method of performing heat treatment on the prepared solution under a reduced pressure atmosphere is favorable. By adopting this method, it is possible to suppress the generation of bubbles also in the case of synthesizing a large amount of $Fe_3O_4$ particles. Further, since those having a low boiling point among the impurities contained in the precursor solution or moisture generated when mixing oleic acid and oleylamine can be removed, it is easy to obtain $Fe_3O_4$ particles having uniform particle size distribution even in a mass synthesis system.

Note that also by dissolving iron acetylacetonate as the raw material in a highly soluble solvent (e.g., phenylethyl ether) in advance, it is possible to suppress the generation of bubbles in the next step. In the case of dissolving iron acetylacetonate in a highly soluble solvent in advance, the degassing treatment may or may not be performed.

(Liquid-Phase Thermal Decomposition Method)

Figure 3:
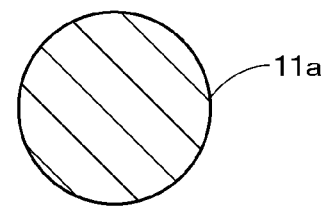
FIG. 3 Parts A to D of FIG. 3 are each a cross-sectional view for describing the method of producing the magnetic powder according to the first embodiment of the present technology.
Figure 3:
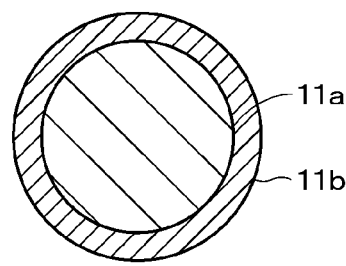
Figure 3:
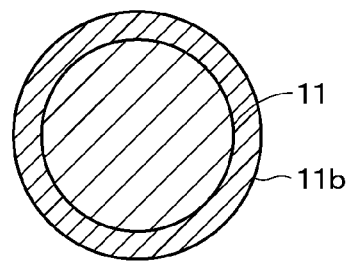
Figure 3:
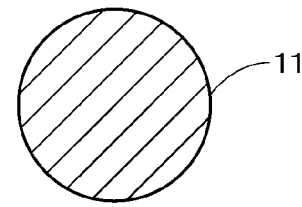

Next, in Step S12, as shown in Part A of FIG. 3, by a liquid-phase complex thermal decomposition method, a powder of $Fe_3O_4$ particles (first particles) 11a as the starting raw material (precursor particles) is synthesized using the solution on which the degassing treatment has been performed. Specifically, the degassed solution is heated under an inert gas atmosphere such as nitrogen gas. Accordingly, nuclei are formed in the precursor solution, and then the formed nuclei grow to synthesize the $Fe_3O_4$ particles.

In the above-mentioned step, it is favorable to synthesize the powder of the $Fe_3O_4$ particles 11a so that the particle size distribution and average particle size of the powder of the $Fe_3O_4$ particles 11a are substantially similar to the particle size distribution and average particle size of the powder of target ε-iron oxide particles. Specifically, it is favorable that the coefficient of variation of the powder of the $Fe_3O_4$ particles 11a represented by the above-mentioned formula (1) is not more than 30%. This is because the coefficient of variation of the magnetic powder can be reduced to not more than substantially 30%. Further, the average particle size of the $Fe_3O_4$ particles 11a is favorably not less than 8 nm and not more than 25 nm, and more favorably not less than 12 nm and not more than 20 nm. This is because the average particle size $D_{ave}$ of the magnetic powder can be substantially within the above-mentioned range. Note that the coefficient of variation and average particle size of the powder of the $Fe_3O_4$ particles 11a are obtained in the same way as the above-mentioned method of calculating the coefficient of variation and average particle size $D_{ave}$ of the magnetic powder.

(Coating Treatment)

Next, in Step S13, silica coating treatment is performed on the surfaces of the $Fe_3O_4$ particles 11a by a reverse micelle method in order to suppress particle aggregation due to high-temperature heat treatment in the next step. Accordingly, as shown in Part B of FIG. 3, a silica coated layer 11b is formed on the surfaces of the $Fe_3O_4$ particles 11a.

(High-Temperature Heat Treatment)

Next, in Step S14, the powder of the $Fe_3O_4$ particles 11a is transformed into a powder of ε-iron oxide particles (second particles) 11 as shown in Part C of FIG. 3 by firing the powder of the $Fe_3O_4$ particles 11a on which the silica coating treatment has been performed at a high temperature not less than 1000° C.

(Coating Removal)

Finally, in Step S15, as shown in Part D of FIG. 3, a target powder of the ε-iron oxide particles 11 is obtained by removing the silica coated layer 11b on the surfaces of the ε-iron oxide particles 11 by using an alkaline solution.

[Effect]

In the magnetic powder according to the first embodiment, the coefficient of variation of the magnetic powder represented by the above-mentioned formula (1) is not more than 30% and the ratio Y/X of the sub-peak height Y near the zero magnetic field to the main peak height X is not more than 0.5 in the SFD curve of the magnetic powder. Accordingly, the magnetic powder having excellent magnetic properties in which variation in particle size of the ε-iron oxide particles is suppressed is obtained. This magnetic powder is suitable for use as a magnetic recording medium having high density.

In the method of producing the magnetic powder according to the first embodiment, since the powder of ε-iron oxide particles is prepared by performing heat treatment on the powder of $Fe_3O_4$ particles, it is possible to make the particle size distribution of the powder of ε-iron oxide particles sharp. Therefore, it is possible to suppress variation in particle size of the powder of ε-iron oxide particles.

In the method of producing the magnetic powder according to the first embodiment, since the powder of $Fe_3O_4$ particles is synthesized by a liquid-phase complex thermal decomposition method, a powder of $Fe_3O_4$ particles having sharp particle size distribution can be obtained. Since the powder of ε-iron oxide particles is synthesized by performing heat treatment on the powder of $Fe_3O_4$ particles having such particle size distribution (i.e., powder of $Fe_3O_4$ particles in which variation in particle size is small), the formation of a phase and γ phase is suppressed and a powder of ε-iron oxide particles having little impurities and high density can be obtained. Therefore, it is possible to obtain a powder of ε-iron oxide particles in a single phase or a powder of ε-iron oxide particles in an almost single phase.

In the production method according to the first embodiment, a powder of $Fe_3O_4$ particles is used as precursor particles. In the case of adopting the synthesis method in the first embodiment as the method of synthesizing the powder of $Fe_3O_4$ particles, it is possible to synthesize $Fe_3O_4$ particles in a short time. Therefore, the productivity of the powder of ε-iron oxide particles can be improved.

Modified Example

Modified Example 1

The magnetic powder of the $Fe_3O_4$ particles 11a may be classified after the step of synthesis of $Fe_3O_4$ particles and before the step of coating treatment to obtain a powder of the $Fe_3O_4$ particles 11a having sharper particle size distribution. In this case, since variation in size of the ε-iron oxide particles can be further suppressed, it is possible to obtain a powder of ε-iron oxide particles having more excellent magnetic properties.

Modified Example 2

In order to adjust the coercive force Hc of the powder of ε-iron oxide particles, the ε-iron oxide particles may be made into a core shell or an additive may be added in the step of producing the powder of ε-iron oxide particles. Note that details of the making of ε-iron oxide particles into a core shell will be described in second and third embodiments.

Modified Example 3

The method of synthesizing $Fe_3O_4$ particles is not limited to the synthesis method described in the first embodiment. For example, any of the following synthesis methods (1) to (3) may be adopted.

<Synthesis Method (1)>

First, 1 mmol of trisodium citrate dihydrate, 4 mmol of sodium hydroxide (NaOH), and 0.2 mol of sodium nitrate ($NaNO_3$) are put into 19 ml of ion exchanged water and stirred. After that, it is heated to 100° C. to obtain a transparent liquid. Subsequently, 2 mmol of iron sulfate tetrahydrate is added, kept at 100° C. for one hour, and cooled to room temperature. $Fe_3O_4$ particles are collected by a magnet from the obtained solution over several hours.

Further, by ultrasonically washing the collected $Fe_3O_4$ particles in water for several minutes, stable $Fe_3O_4$ particles can be obtained.

<Synthesis Method (2)>

First, 1 mmol of iron (III) acetylacetonate and 3 mmol of 1,2-hexadecanediol are put into a mixed solvent of 15 ml of oleic acid and 15 ml of oleylamine. Subsequently, after heating it at 130° C. for 30 minutes under a reduced pressure atmosphere of approximately 200 Pa, it is heated at approximately 300° C. for six hours under a nitrogen atmosphere of one atm. After the heating is finished, the solution is cooled to room temperature, and the obtained solution is washed with ethanol and hexane to obtain $Fe_3O_4$ particles.

<Synthesis Method (3)>

$Fe_3O_4$ particles are synthesized as follows using a single mode microwave system (Monowave 300). Note that this system can operate at 850 W/2.45 GHz at most. First, 1 mmol of iron (III) acetylacetonate is added to a mixed solvent of 4 ml of oleic acid, 10 ml of oleylamine, and 2 ml of 1-octadecene to prepare a solution, the temperature thereof is increased from room temperature to 200° C. in 10 minutes by applying the maximum output 850 W of the single mode microwave system, and it is kept for 10 minutes in the state. After that, the temperature of the solution is increased to 250° C. in 15 minutes, and kept for five minutes until the reaction is completed. Subsequently, it is cooled by compressed air to 60° C. in approximately three minutes, and the obtained solution is washed with ethanol and acetone and finally dried to obtain $Fe_3O_4$ particles.

2 Second Embodiment

[Configuration of Magnetic Powder]

Figure 4:
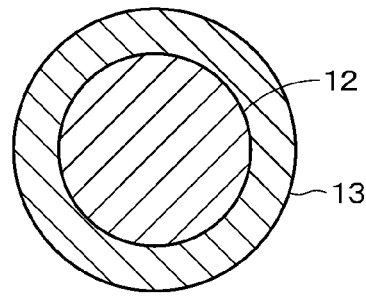
FIG. 4 is a cross-sectional view showing a configuration of a magnetic powder according to a second embodiment of the present technology.

A magnetic powder according to a second embodiment of the present technology is a powder of ε-iron oxide particles having a core-shell structure. As shown in FIG. 4, core-shell particles each include a core portion 12 and a shell portion 13 provided around the core portion 12. The core portion 12 and the shell portion 13 are exchange-coupled. At the interface between the core portion 12 and the shell portion 13, the composition and/or state of the both portions may be varied in a discontinuous manner or in a continuous manner. The magnetic powder according to the second embodiment is suitable for use as a recording layer (magnetic layer) of a magnetic recording medium having high density.

(Core Portion)

The core portion 12 is similar to the ε-iron oxide particles in the first embodiment.

(Shell Portion)

The shell portion 13 covers at least a part of the periphery of the core portion 12. Specifically, the shell portion 13 may partially cover the periphery of the core portion 12 or cover the entire periphery of the core portion 12. From the viewpoint of sufficient exchange-coupling between the core portion 12 and the shell portion 13 and improvement of magnetic properties, it is favorable to cover the entire surface of the core portion 12.

The shell portion 13 contains α-Fe that is a soft magnetic material. The shell portion 13 can be obtained by, for example, reducing the surfaces of ε-iron oxide particles (hard magnetic particles) as a precursor of the core-shell particles. Specifically, for example, the α-Fe contained in the shell portion 13 can be obtained by reducing ε-iron oxide contained in the core portion 12.

[Method of Producing Magnetic Powder]

Figure 5:
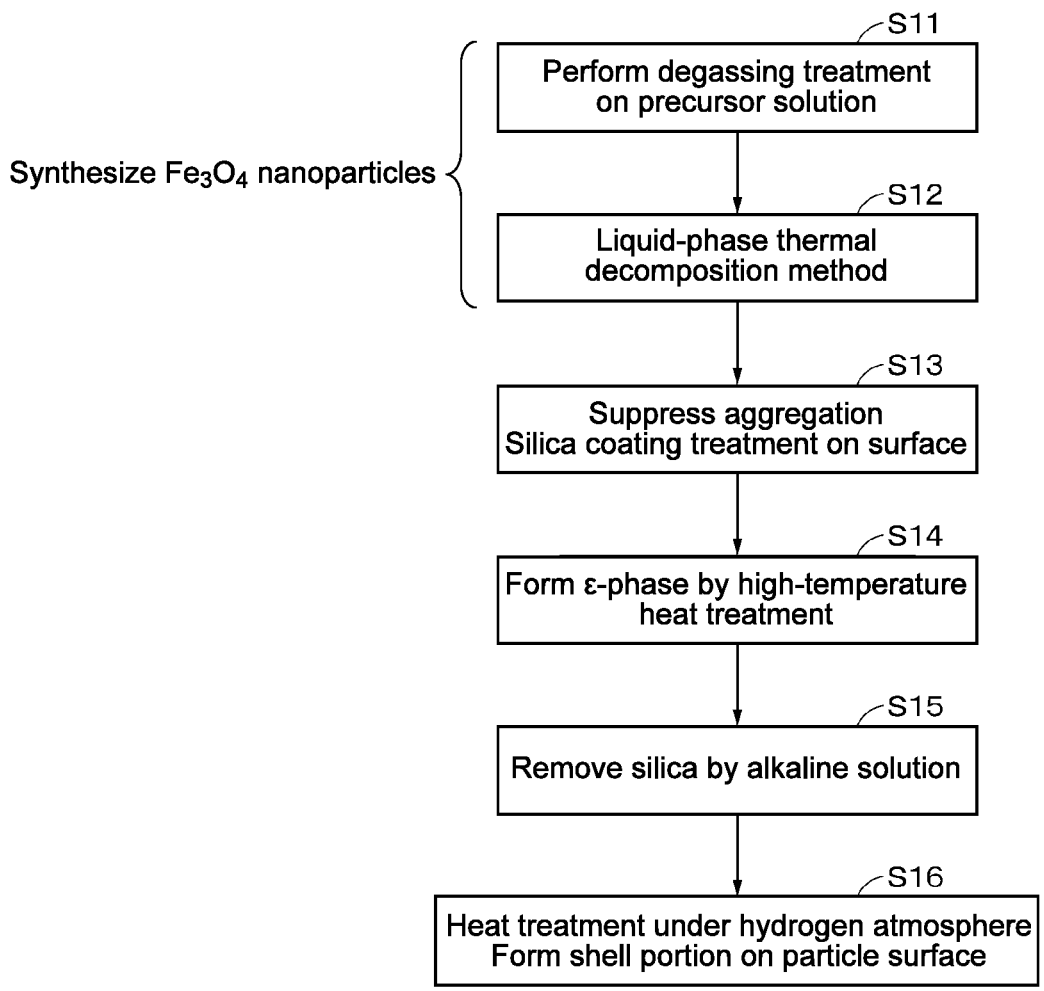
FIG. 5 is a process chart for describing a method of producing the magnetic powder according to the second embodiment of the present technology.

A method of producing the magnetic powder according to the second embodiment of the present technology is different from the method of producing the magnetic powder according to the first embodiment in that the following reduction treatment step (Step S16) after the coating removal step (Step S15) is further included as shown in FIG. 5.

(Reduction Treatment)

In Step S16, reduction treatment is performed on the powder of the ε-iron oxide particles 11 obtained by removing the silica coated layer 11b. Specifically, by performing heat treatment on the above-mentioned powder of the ε-iron oxide particles 11 under a high-temperature hydrogen atmosphere for a certain time period, the surfaces of the particles are reduced. Accordingly, the shell portion 13 containing α-Fe is formed around the core portion 12. In this way, a target powder of ε-iron oxide particles having a core-shell structure is obtained.

[Effect]

The magnetic powder according to the second embodiment contains a powder of the core-shell particles that include the core portion 12 containing ε-iron oxide and the shell portion 13 containing α-Fe. By forming a recording layer of a magnetic recording medium by using this magnetic powder, it is possible to realize a magnetic recording medium having high output, excellent thermal stability, and recordability.

In the method of producing the magnetic powder according to the second embodiment, by performing reduction treatment on ε-iron oxide particles that are hard magnetic particles, the core-shell particles that include the shell portion 13 containing α-Fe that is a soft magnetic material are formed. Accordingly, it is possible to prepare uniform core-shell particles, and cause the exchange interaction between ε-iron oxide particles to be the core portion 12 and α-Fe to be the shell portion 13 to uniformly occur. Therefore, it is possible to take advantage of the characteristics of the soft magnetic material having a high saturation magnetization amount σs, and achieve the high saturation magnetization amount σs as the whole core-shell particles. Similarly for the recordability, the coercive force Hc of the whole core-shell particles can be adjusted to the coercive force Hc suitable for recording while keeping the coercive force Hc of the core portion 12 alone to a large value in order to ensure the thermal stability, thereby making it possible to increase the recordability. Further, since also the ε-iron oxide particles to be the core portion 12 can be made larger than those produced by existing methods, it is easy to maintain a high coercive force Hc, which is advantageous for improving the thermal stability.

Further, in the method of producing the magnetic powder according to the second embodiment, since reduction treatment is directly performed on the surfaces of ε-iron oxide particles prepared in advance, the particle size of the ε-iron oxide particles to be a precursor and the particle size of the core-shell particles obtained by the reduction treatment are substantially the same. Therefore, by adjusting the particle size of the ε-iron oxide particles to be a precursor, it is possible to prepare the core-shell particles having a desired particle size. Therefore, it is possible to suppress occurrence of variation in particle size distribution.

Modified Example

Reduction treatment may be performed on the powder of the ε-iron oxide particles 11 with calcium hydride ($CaH_2$). $CaH_2$ is known to have very strong reducibility. Therefore, it can be used as an alternative to $H_2$ when reducing the powder of the ε-iron oxide particles 11 to form α-Fe. Since $CaH_2$ has very strong reducibility, reduction at a lower temperature than that of $H_2$ can be performed. Further, it is also possible to suppress the aggregation of the ε-iron oxide particles 11 during reduction.

3 Third Embodiment

[Configuration of Magnetic Powder]

Figure 6:
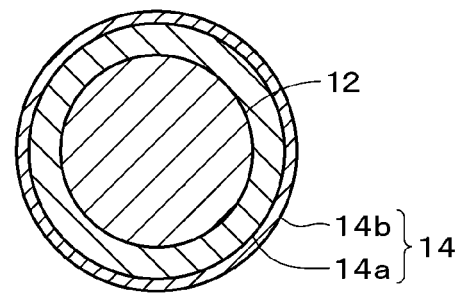
FIG. 6 is a cross-sectional view showing a configuration of a magnetic powder according to a third embodiment of the present technology.

A magnetic powder according to a third embodiment of the present technology is a powder of core-shell particles including the core portion 12 and a shell portion 14 that is provided around the core portion 12 and has a two-layer structure as shown in FIG. 6. The same components as those in the second embodiment will be denoted by the same reference symbols, and description thereof will be omitted.

(Shell Portion)

The shell portion 14 having a two-layer structure includes a first shell portion 14a provided on the core portion 12, and a second shell portion 14b provided on the first shell portion 14a.

(First Shell Portion)

The first shell portion 14a that is a soft magnetic layer is similar to the shell portion 14 in the second embodiment.

(Second Shell Portion)

The second shell portion 14b is an oxide coating film as an oxidation prevention layer. The second shell portion 14b contains a material that can be obtained by oxidizing α-Fe (soft magnetic material) contained in the first shell portion 14a, e.g., at least one iron oxide of $Fe_3O_4$, $Fe_2O_3$, and FeO.

[Method of Producing Magnetic Powder]

Figure 7:
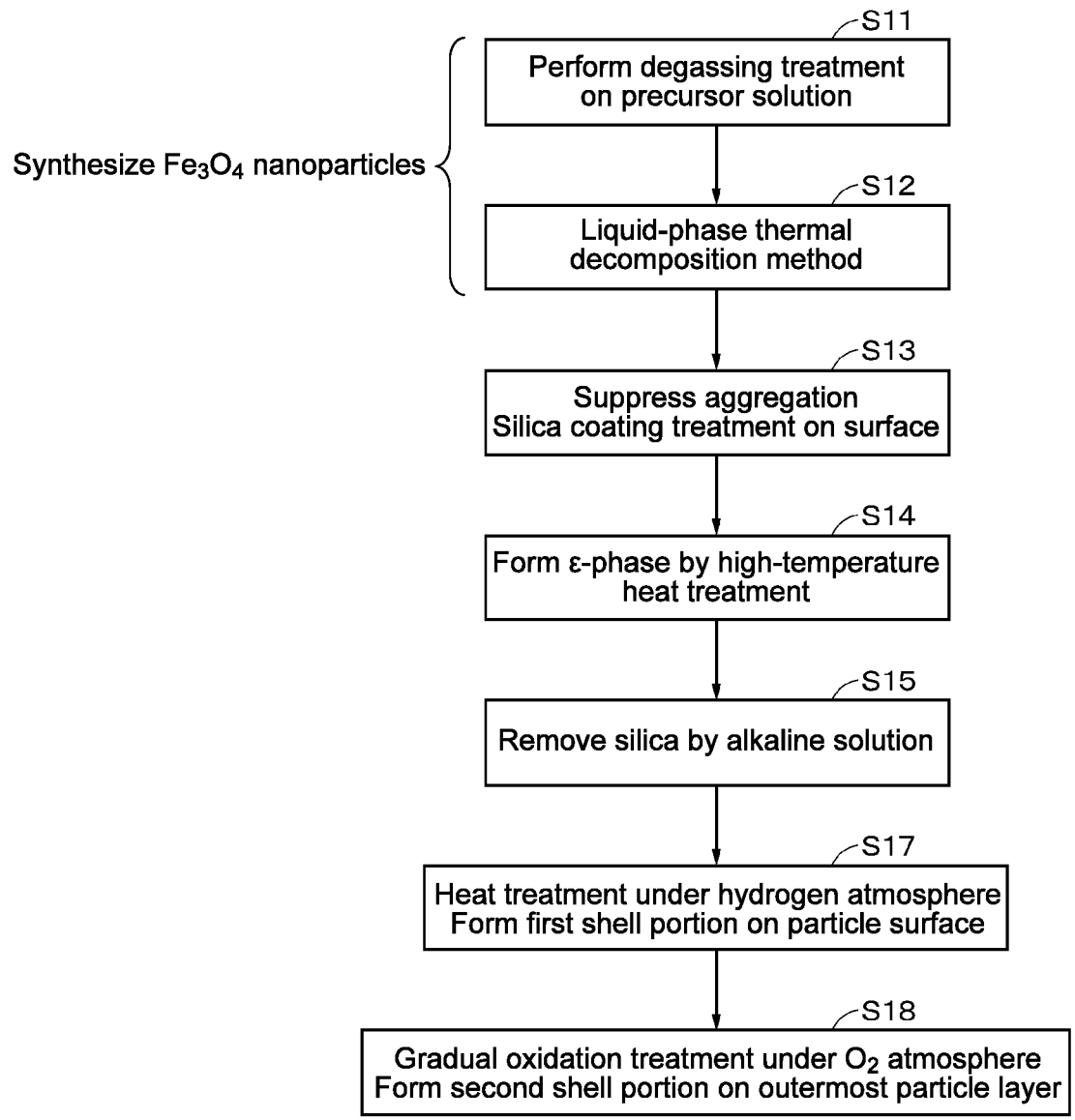
FIG. 7 is a process chart for describing a method of producing the magnetic powder according to the third embodiment of the present technology.

A method of producing the magnetic powder according to the third embodiment of the present technology is different from the method of producing the magnetic powder according to the first embodiment in that the following steps of reduction treatment step (Step S17) and gradual oxidation treatment step (Step S18) are further included after the coating removal step (Step S15) as shown in FIG. 7.

(Reduction Treatment)

In Step S17, reduction treatment is performed on the powder of the ε-iron oxide particles 11 obtained by removing the silica coated layer 11b. Accordingly, the first shell portion 14a containing α-Fe is formed around the core portion 12. Note that the reduction treatment in Step S17 is similar to the reduction treatment in Step S16 in the second embodiment.

(Gradual Oxidation Treatment)

In Step S18, gradual oxidation treatment is performed on the powder of the ε-iron oxide particles 11 whose surfaces are covered by the first shell portion 14a. Specifically, after cooling the above-mentioned powder of the ε-iron oxide particles 11 to room temperature in a nitrogen atmosphere, heat treatment is performed thereon in an atmosphere of $O_2+N_2$ mixed gas to form the second shell portion 14b as an oxide coating film on the outermost layer. Accordingly, it is possible to obtain a powder of core-shell ε-iron oxide particles having excellent oxidation resistance.

[Effect]

In the magnetic powder according to the third embodiment, since the core-shell particles each have the second shell portion 14b on the surface, it is possible to prevent the surfaces of the core-shell particles from being exposed to air to cause rust and the like on the surfaces of the core-shell particles to occur. Therefore, it is possible to suppress the deterioration of characteristics of the magnetic powder.

4 Fourth Embodiment

[Configuration of Magnetic Recording Medium]

Figure 8:
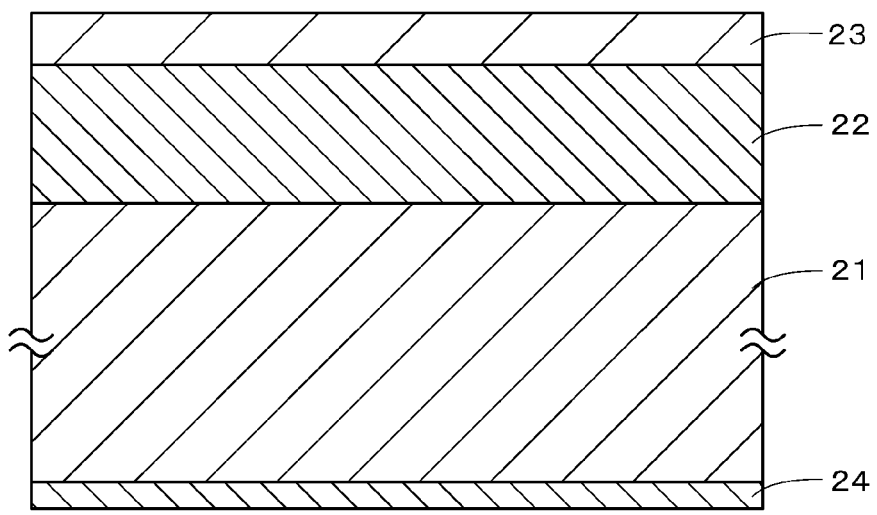
FIG. 8 is a cross-sectional view showing a configuration of a magnetic recording medium according to a fourth embodiment of the present technology.

A magnetic recording medium according to a fourth embodiment of the present technology is a so-called perpendicular magnetic recording medium, and includes an elongated substrate 21, an underlayer (nonmagnetic layer) 22 provided on one main surface of the substrate 21, and a recording layer (magnetic layer) 23 provided on the underlayer 22 as shown in FIG. 8. The magnetic recording medium may further include a protective layer (not shown) provided on the recording layer 23, a lubricant layer (not shown), and the like as necessary. Further, as necessary, a backcoat layer 24 provided on the other main surface of the substrate 21 may be further included.

(SFD)

In the SFD curve, the ratio Y/X of the sub-peak height Y near the zero magnetic field to the main peak height X is not more than 0.5 (see FIG. 1). When the ratio Y/X exceeds 0.5, variation in particle size of the ε-iron oxide particles becomes large, and there is a possibility that magnetic properties of the recording layer 23 are reduced and C/N (Carrier to Noise Ratio) is deteriorated.

The above-mentioned ratio Y/X is obtained as follows. First, the M-H loop of the entire magnetic recording medium is measured using a VSM. After that, the coating films (the underlayer 22, the recording layer 23, and the like) are wiped using acetone and ethanol, or the like to leave the substrate 21 only, and the M-H loop of the substrate 21 is measured for background correction. Here, the measurement of the M-H loop is performed at room temperature (23° C.). After that, the M-H loop after the background correction is calculated by subtracting the M-H loop of the substrate 21 from the M-H loop of the entire magnetic recording medium. After that, the ratio Y/X is obtained in the same way as that in the case of the magnetic powder according to the first embodiment. Note that in the case where the M-H loop after the background correction is not saturated in the measurement of the M-H loop by the VSM, a SQUID that can obtain a higher applied magnetic field is used. The above-mentioned ratio Y/X is a value obtained by performing measurement in the direction perpendicular to the recording layer 23. Further, "demagnetizing field correction" when performing measurement in the perpendicular direction is not performed.

(δ/Mrt)

δ/Mrt satisfies the relationship represented by the following formula (2).

$$2.0 \leq \delta/Mrt \leq 120.0 \qquad (2)$$

(in which δ [nm] is the average thickness of the recording layer 23 and Mrt [mA] is the product of the residual magnetization amount and the thickness of the recording layer 23.)

In the case where the average thickness δ of the recording layer 23 is small, the ratio of the variation of the average thickness δ to the average thickness δ inevitably becomes large, which may result in deterioration of C/N. Meanwhile, in the case where the average thickness δ of the recording layer 23 is large, there is a possibility that the recorded magnetization forms a closed loop in the recording layer 23, which causes a reduction in output and deteriorates C/N. Further, in the case where Mrt is small, there is a possibility that the output is reduced and C/N is deteriorated. Meanwhile, in the case where Mrt is large, there is a possibility that the reproduction head is saturated and favorable C/N is not obtained. In order to suppress the above-mentioned deterioration of C/N, δ/Mrt is set to satisfy the relationship represented by the above-mentioned formula (2).

The above-mentioned ratio δ/Mrt is calculated from δ [nm] and Mrt [mA] obtained as follows.

δ [nm] is obtained as follows. First, a magnetic recording medium to be measured is processed by an FIB (Focused Ion Beam) method or the like to prepare a slice for TEM observation, and the cross section of the slice is observed by TEM. It is favorable that the observation magnification be at least not less than 100,000 times so that the thickness of the recording layer 23 can be clearly observed. The observation of the cross-sectional TEM is performed at total five positions for every 100 m in the longitudinal direction (traveling direction) of the magnetic recording medium. The observation direction at each position is the lateral direction (width direction) of the magnetic recording medium. The thickness of the recording layer 23 is observed at evenly 50 points per field of view, and the average thickness δ[nm] of the recording layer 23 is obtained by simply averaging (arithmetic average) the thicknesses in all five fields of view.

Mrt [rmA] is obtained as follows. First, the M-H loop of the magnetic recording medium is measured using a VSM. Next, coating films (the underlayer 22, the recording layer 23, and the like) of the magnetic recording medium are wiped using acetone and ethanol to leave only the substrate 21, and the M-H loop of the substrate 21 alone is measured. Subsequently, by subtracting the M-H loop of the substrate 21 alone from the M-H loop of the magnetic recording medium, the M-H loop after background correction is obtained. Here, the measurement of the M-H loop is performed at room temperature (23° C.). After that, the residual magnetization amount Mr [emu] is obtained from the obtained M-H loop after the background correction, and divided by the area of the measurement sample to calculate Mrt [mA]. Note that in the case where the M-H loop after the background correction is not saturated in the measurement of the M-H loop by the VSM, a SQUID that can obtain a higher applied magnetic field is used.

(Squareness Ratio)

A squareness ratio Rs in the direction perpendicular to the recording layer 23 is favorably not less than 60%. In the case where the squareness ratio Rs is less than 60%, there is a possibility that C/N is reduced.

The squareness ratio Rs [%] is obtained as follows. First, similarly to the case the above-mentioned "δ/Mrt" is obtained, the residual magnetization amount Mr [emu] is obtained. Next, among the M-H loops measured when obtaining the above-mentioned "δ/Mrt", a magnetization amount Ms [emu] of a part where the magnetization amount is saturated by application of a sufficient magnetic field is obtained. Then, by dividing Mr [emu] obtained as described above by Ms [emu], the squareness ratio Rs [%] (=(Mr/Ms)×100) of the M-H loop is calculated. Note that the above-mentioned Mr and Ms each represent a value obtained by performing measurement in the direction perpendicular to the recording layer 23.

(Substrate)

The substrate 21 as a supporting body is an elongated nonmagnetic substrate having flexibility. The nonmagnetic substrate is a film, and the thickness of the film is, for example, not less than 3 μm and not more than 8 μm. As the material of the substrate 21, polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyimide, and polyamideimide, light metals such as aluminum alloys and titanium alloys, ceramics such as alumina glass, and the like can be used.

(Recording Layer)

The recording layer 23 contains, for example, the magnetic powder according to the first embodiment, a binder, and conductive particles. The recording layer 23 may further contain additives such as a lubricant, an abrasive, and a rust inhibitor as necessary.

As the binder, resin having a structure obtained by causing a crosslinking reaction to occur in polyurethane resin, vinyl chloride resin, or the like is favorable. However, the binder is not limited thereto, and other resins may be appropriately blended in accordance with, for example, the physical properties required for the magnetic recording medium. The resin to be blended is not particularly limited as long as it is resin generally used in a coating-type magnetic recording medium.

Examples of the resin include polyvinyl chloride, polyvinyl acetate, vinyl chloride-vinyl acetate copolymer, vinyl chloride-vinylidene chloride copolymer, vinyl chloride-acrylonitrile copolymer, acrylate ester-acrylonitrile copolymer, acrylate ester-vinyl chloride-vinylidene chloride copolymer, vinyl chloride-acrylonitrile copolymer, acrylate ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyester resin, amino resin, and synthetic rubber.

Further, examples of thermosetting resin or reactive resin include phenol resin, epoxy resin, urea resin, melamine resin, alkyd resin, silicone resin, polyamine resin, and urea formaldehyde resin.

Further, in order to improve the dispersibility of the magnetic powder, polar functional groups such as —$SO_3M$, —$OSO_3M$, —COOM, and P=O(OM)$_2$ may be introduced into the above-mentioned binders. Here, M in the formula represents a hydrogen atom or an alkali metal such as lithium, potassium, and sodium.

Further, examples of the polar functional groups include a side-chain group having a terminal group of —NR1R2 or —NR1R2R3$^+$X$^-$, and a main-chain group of >NR1R2$^+$X$^-$. Here, R1, R2, and R3 in the formula each represent a hydrogen atom or a hydrocarbon group, and X represents a halogen element ion such as fluorine, chlorine, bromine, and iodine, or an inorganic or organic ion. Further, examples of the polar functional groups include also —OH, —SH, —CN, and an epoxy group.

The recording layer 23 may further contain, as nonmagnetic reinforcing particles, aluminum oxide (α, β, or γ alumina), chromium oxide, silicon oxide, diamond, garnet, emery, boron nitride, titanium carbide, silicon carbide, titanium carbide, and titanium oxide (rutile-type or anatase-type titanium oxide).

The average thickness δ of the recording layer 23 is favorably not less than 30 nm and not more than 120 nm, and more favorably not less than 50 nm and not more than 70 nm. In the case where the average thickness δ of the recording layer 23 is less than 30 nm, there is a possibility that it becomes difficult to form the recoding layer 23 having a uniform thickness by coating. Meanwhile, in the case where the average thickness δ of the recording layer 23 exceeds 120 nm, there is a possibility that the output of the region having a short wavelength, which is required as a magnetic recording medium having high density, is deteriorated due to incoherent reversal of magnetization or the like. Note that the above-mentioned method of calculating the average thickness δ of the recording layer 23 is as described in the method of calculating the ratio δ/Mrt.

(Underlayer)

The underlayer 22 is a nonmagnetic layer containing a nonmagnetic powder and a binder as main components. The underlayer 22 may further contain additives of at least one of conductive particles, a lubricant, a curing agent, and a rust inhibitor as necessary.

The nonmagnetic powder may be an inorganic material or an organic material. Further, the nonmagnetic powder may be carbon black or the like. Examples of the inorganic material include a metal, a metal oxide, a metal carbonate, a metal sulfate, a metal nitride, a metal carbide, and a metal sulfide. Examples of the shape of the nonmagnetic powder include, but not limited to, various shapes such as a needle shape, a spherical shape, a cubic shape, and a plate shape. The binder is similar to that in the above-mentioned recording layer 23.

The average thickness of the underlayer 22 is favorably not less than 0.6 μm and not more than 2.0 μm, and more favorably not less than 0.8 μm and not more than 1.4 μm. In the case where the average thickness of the underlayer 22 is less than 0.6 μm, there is a possibility that the electromagnetic conversion characteristics are deteriorated due to deterioration of the surface property. Meanwhile, in the case where the average thickness of the underlayer 22 exceeds 2.0 μm, coarse protrusions are generated due to drying unevenness of the coating film, and there is a possibility that the electromagnetic conversion characteristics are deteriorated similarly. Note that the above-mentioned method of calculating the average thickness of the underlayer 22 is similar to the method of calculating the average thickness δ of the recording layer 23.

[Method of Producing Magnetic Recording Medium]

Next, an example of the method of producing the magnetic recording medium having the above-mentioned configuration will be described. First, a nonmagnetic powder, a binder, and the like are kneaded and dispersed in a solvent to prepare a coating material for forming an underlayer. Next, the magnetic powder according to the first embodiment, a binder, and the like are kneaded and dispersed in a solvent to prepare a coating material for forming a recording layer. For the preparation of the coating material for forming a recording layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited these devices.

Next, the coating material for forming an underlayer is coated on one main surface of the substrate 21 and dried to form the underlayer 22. Next, the coating material for forming a recording layer is coated on the underlayer 22 and dried to form the recording layer 23 on the underlayer 22. Note that at the time of drying, the magnetic field of the magnetic powder may be oriented in the thickness direction of the substrate 21 by, for example, a solenoid coil. Next, as necessary, a protective layer and a lubricant layer may be formed on the recording layer 2β, or the backcoat layer 24 may be formed on the other main surface of the substrate 21.

Next, the substrate 21 on which the underlayer 22 and the recording layer 23 are formed is rewound around the large-diameter core and hardened. Next, calendaring treatment is performed on the substrate 21 on which the underlayer 22 and the recording layer 23 are formed, and then it is cut into a predetermined a width. Thus, a target magnetic recording medium can be obtained.

[Effect]

In the magnetic recording medium according to the fourth embodiment of the present technology, since the recording layer 23 contains the magnetic powder according to the first embodiment, it is possible to realize a magnetic recording medium having excellent magnetic properties. Therefore, it is possible to reproduce, with low noise, a signal recorded with high density. Therefore, it is possible to achieve high C/N.

Modified Example

Modified Example 1

The recording layer 23 may contain the magnetic powder according to the second or third embodiment instead of the magnetic powder according to the first embodiment. In this case, it is possible to achieve higher C/N than that in the magnetic recording medium according to the fourth embodiment.

Modified Example 2

Figure 9:
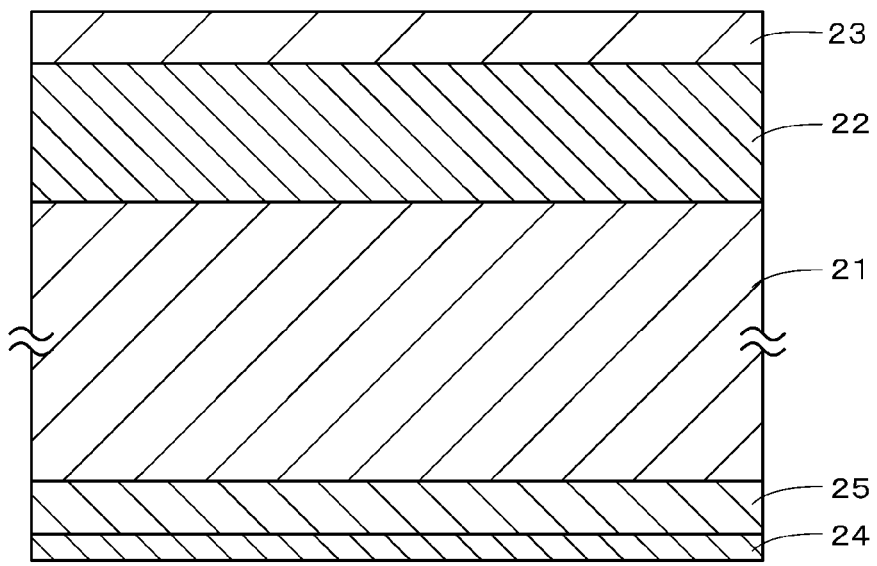
FIG. 9 is a cross-sectional view showing a configuration of a magnetic recording medium according to Modified Example 2 the fourth embodiment of the present technology.

As shown in FIG. 9, the magnetic recording medium may further include a reinforcement layer 25 provided on the other main surface (hereinafter, referred to as "rear surface") that is the side of the backcoat layer 24 of both main surfaces of the substrate 21. In this case, the backcoat layer 24 is provided on the reinforcement layer 25.

Note that the reinforcement layer 25 may be provided on either of the both main surfaces of the substrate 21, and the reinforcement layer 25 may be provided on one surface (hereinafter, referred to as "front surface") that is the side of the recording layer 23 of the both main surfaces of the substrate 21. In this case, the underlayer 22 is provided on the reinforcement layer 25.

The reinforcement layer 25 is for enhancing the mechanical strength of the magnetic recording medium and achieving excellent dimensional stability. The reinforcement layer 25 contains, for example, at least one of a metal and a metal compound. Here, it is defined that the metal includes semimetal. The metal is, for example, at least one of aluminum and copper, and is favorably copper. This is because copper is inexpensive and has relatively low vapor pressure, so that the reinforcement layer 25 can be deposited at low cost. The metal compound is, for example, metal oxide. The metal oxide is for example, at least one of aluminum oxide, copper oxide, and silicon oxide, and is favorably copper oxide. This is because the reinforcement layer 25 can be deposited at low cost by a vapor deposition or the like. The reinforcement layer 25 may be, for example, a deposition film formed by a vacuum oblique evaporation method or a sputtering film formed by a sputtering method.

The reinforcement layer 25 favorably has a laminated structure of two or more layers. As the thickness of the reinforcement layer 25 is increased, expansion and contraction of the substrate 21 against external force can be further suppressed. However, in the case of forming the reinforcement layer 25 by using a technology for producing a vacuum thin film such as a deposition method and sputtering, there is a possibility that voids tend to occur in the reinforcement layer 25 as the thickness of the reinforcement layer 25 is increased as described above. By forming the reinforcement layer 25 to have a laminated structure of two or more layers as described above, it is possible to suppress the voids generated in the reinforcement layer 25 when forming the reinforcement layer 25 by using the technology for producing a vacuum thin film, and improve the denseness of the reinforcement layer 25. Therefore, since the water vapor permeability of the reinforcement layer 25 can be reduced, it is possible to further suppress the expansion of the substrate 21 and further improve the dimension stability of the magnetic recording medium. In the case where the reinforcement layer 25 has a laminated structure of two or more layers, the materials of each layer may be the same or different.

The average thickness of the reinforcement layer 25 is favorably not less than 150 nm and not more than 500 nm. In the case where the average thickness of the reinforcement layer 25 is not less than 150 nm, a favorable function (i.e., favorable dimension stability of the magnetic recording medium) as the reinforcement layer 25 is achieved. Meanwhile, a sufficient function as the reinforcement layer 25 can be achieved without increasing the average thickness of the reinforcement layer 25 to more than 500 nm. Note that the above-mentioned average thickness of the reinforcement layer 25 is obtained in the same way as that of the method of calculating the above-mentioned average thickness δ of the recording layer 23.

In the case where the magnetic recording medium includes the reinforcement layer 25, the Young's modulus in the longitudinal direction of the elongated magnetic recording medium is favorably not less than 7 GPa and not more than 14 GPa. In the case where the Young's modulus is not less than 7 GPa, it is possible to achieve favorable magnetic head contact and suppress edge damage. Meanwhile, in the case where the Young's modulus is not more than 14 GPa, it is possible to achieve favorable magnetic head contact.

Further, the humidity expansion coefficient of the magnetic recording medium is favorably not less than 0.5 ppm/% RH and not more than 4 ppm/% RH. In the case where the humidity expansion coefficient is within the above-mentioned range, it is possible to further improve the dimension stability of the magnetic recording medium.

Modified Example 3

Figure 10:
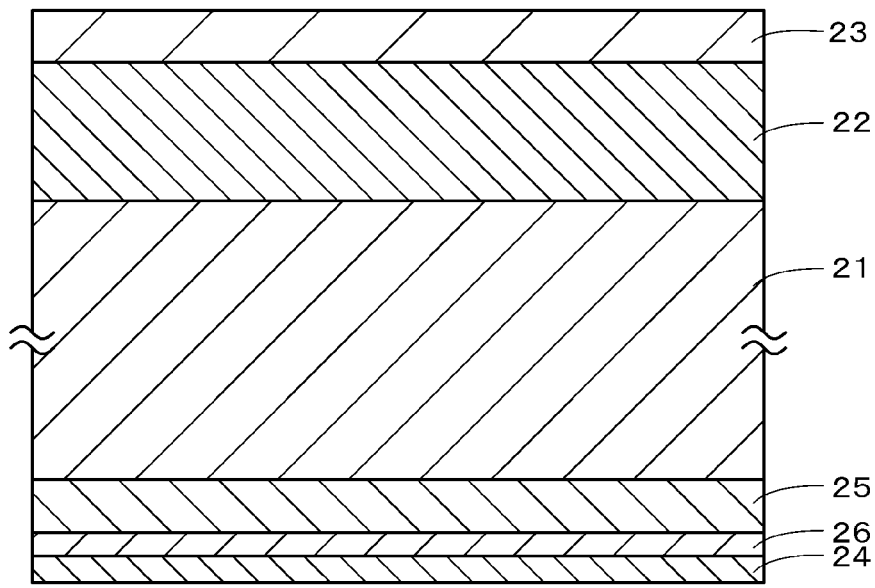
FIG. 10 is a cross-sectional view showing a configuration of a magnetic recording medium according to Modified Example 3 the fourth embodiment of the present technology.

As shown in FIG. 10, the magnetic recording medium may further include a cupping suppression layer 26 provided on the reinforcement layer 25. Note that in the case where the underlayer 22 and the cupping suppression layer 26 are provided on the rear surface side of the substrate 21, the backcoat layer 24 is provided on the cupping suppression layer 26. Meanwhile, in the case where the underlayer 22 and the cupping suppression layer 26 are provided on the front surface side of the substrate 21, the underlayer 22 is provided on the cupping suppression layer 26.

The cupping suppression layer 26 is for suppressing cupping generated by forming the reinforcement layer 25 on the substrate 21. Here, the cupping means a curve generated in the width direction of the elongated substrate 21. Tensile stress as internal stress, i.e., stress acting to bend, in the width direction and into a concave shape, the side of the main surface on which the reinforcement layer 25 is provided of the both surfaces of the substrate 21 acts on the reinforcement layer 25. Meanwhile, compressive stress as internal stress, i.e., stress acting to bend, in the width direction and into a convex shape, the side of the main surface on which the cupping suppression layer 26 is provided of the both surfaces of the substrate 21 acts on the cupping suppression layer 26. For this reason, the internal stresses of the reinforcement layer 25 and the cupping suppression layer 26 cancel out each other, making it possible to suppress occurrence of cupping in the magnetic recording medium. Therefore, it is possible to maintain the favorable contact state between the magnetic head and the magnetic recording medium, and provide a high SN magnetic recording medium having high dimension stability in the track width direction and excellent off-track characteristics.

The cupping suppression layer 26 is, for example, a carbon thin film. The carbon thin film is favorably a hard carbon thin film containing diamond-like carbon (hereinafter, referred to as "DLC"). The cupping suppression layer 26 may be, for example, a CVD film formed by a chemical vapor deposition (CVD) method or a sputtering film formed by a sputtering method.

The cupping suppression layer 26 favorably has a laminated structure of two or more layers. This is because the dimension stability of the magnetic recording medium can be further improved. Note that the principle thereof is similar to that in the case where the reinforcement layer 25 has a laminated structure of two or more layers. In the case where the cupping suppression layer 26 has a laminated structure of two or more layers, the material of each layer may be the same or different.

The average thickness of the cupping suppression layer 26 is favorably not less than 10 nm and not more than 200 nm. In the case where the average thickness of the cupping suppression layer 26 is less than 10 nm, there is a possibility that the compressive stress of the cupping suppression layer 26 is too small. Meanwhile, in the case where the average thickness of the cupping suppression layer 26 exceeds 200 nm, there is a possibility that the compressive stress of the cupping suppression layer 26 is too large. Note that the average thickness of the cupping suppression layer 26 is obtained in the same way as that of the above-mentioned method of calculating the average thickness δ of the recording layer 23.

Modified Example 4

Figure 11:
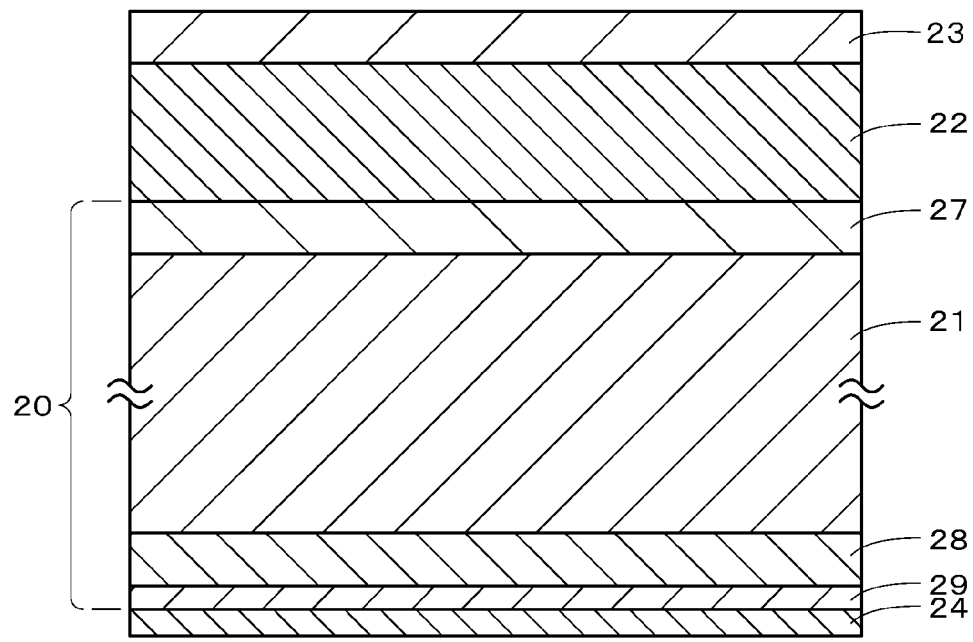
FIG. 11 is a cross-sectional view showing a configuration of a magnetic recording medium according to Modified Example 4 the fourth embodiment of the present technology.

As shown in FIG. 11, the magnetic recording medium may further include a first reinforcement layer 27 provided on the surface of the substrate 21, a second reinforcement layer 28 provided on the rear surface of the substrate 21, and an adhesion suppression layer 29 provided on the second reinforcement layer 28. In this case, the backcoat layer 24 is provided on the adhesion suppression layer 29. The substrate 21, the first reinforcement layer 27, the second reinforcement layer 28, and the adhesion suppression layer 29 constitute a laminate 20.

Note that the adhesion suppression layer 29 only needs to be provided on any one of the first and second reinforcement layers 27 and 28, and the adhesion suppression layer 29 may be provided on the first reinforcement layer 27. In this case, the underlayer 22 is provided on the adhesion suppression layer 29. In this case, in the case where the adhesion suppression layer 29 is a carbon thin film, it is favorable to improve the wettability of the surface of the adhesion suppression layer 29 by surface modification treatment. This is because the coatability on the carbon thin film of the coating material for forming an underlayer can be improved.

The first and second reinforcement layers 27 and 28 are for enhancing the mechanical strength of the magnetic recording medium and achieving excellent dimension stability. As the materials of the first and second reinforcement layers 27 and 28, materials similar to those of the reinforcement layer 25 according to Modified Example 3 can be exemplified. Note that the materials of the first and second reinforcement layers 27 and 28 may be the same material or different materials. It is favorable that the first and second reinforcement layers 27 and 28 each have a laminated structure of two or more layers. This is because the dimension stability of the magnetic recording medium can be further improved. Note that the principle thereof is similar to that in the case where the reinforcement layer 25 has a laminated structure of two or more layers in Modified Example 3.

The average thickness of each of the first and second reinforcement layers 27 and 28 is favorably not less than 75 nm and not more than 300 nm. In the case where the average thickness of each of the first and second reinforcement layers 27 and 28 is not less than 75 nm, favorable functions (i.e., favorable dimension stability of the magnetic recording medium) as the first and second reinforcement layers 27 and 28 are achieved. Meanwhile, the average thickness of each of the first and second reinforcement layers 27 and 28 is increased to be larger than 300 nm, there is a possibility of the thickness of the magnetic recording medium is large. Further, sufficient functions as the first and second reinforcement layers 27 and 28 can be achieved without increasing the average thickness of each of the first and second reinforcement layers 27 and 28 to more than 300 nm. Note that the average thickness of each of the first and second reinforcement layers 27 and 28 is obtained in the same way as that of the above-mentioned method of calculating the average thickness δ of the recording layer 23.

Tensile stress as internal stress acts on the first and second reinforcement layers 27 and 28. Specifically, the first reinforcement layer 27 has stress acting to bend the front surface side of the substrate 21 in the width direction and into a concave shape, and the second reinforcement layer 28 has stress acting to bend the rear surface side of the substrate 21 in the width direction and into a concave shape. Therefore, internal stresses of the first and second reinforcement layers 27 and 28 cancel out each other, making it possible to suppress occurrence of cupping in the magnetic recording medium. Here, the cupping means a curve generated in the width direction of the elongated substrate 21.

The average thicknesses of the first and second reinforcement layers 27 and 28 may be the same or different, but favorably the same or substantially the same. This is because the internal stresses (tensile stresses) the first and second reinforcement layers 27 and 28 provided on both surfaces of the substrate 21 are the same or substantially the same, so that occurrence of cupping can be further suppressed. Here, "the average thicknesses of the first and second reinforcement layers 27 and 28 are substantially the same" means that the difference between the average thicknesses of the first and second reinforcement layers 27 and 28 is within 5 nm.

The adhesion suppression layer 29 is for suppressing adhesion of the first and second reinforcement layers 27 and 28 by metal adhesion when the laminate 20 is wound into a roll. The adhesion suppression layer 29 may have conductivity or may have insulating properties. The adhesion suppression layer 29 may have compressive stress (i.e., stress acting to bend, in the width direction and into a convex shape, the side of the surface on which the adhesion suppression layer 29 is provided of both surfaces of the substrate 21) as internal stress, or tensile stress (i.e., stress acting to bend, in the width direction and into a concave shape, the side of the surface on which the adhesion suppression layer 29 is provided of the substrate 21) as internal stress.

In the case where the tensile stresses (internal stresses) of the first and second reinforcement layers 27 and 28 differ, the adhesion suppression layer 29 having compressive stress as internal stress may be provided on one of the first and second reinforcement layers 27 and 28, which has higher tensile stress. This is because the tensile stress that cannot be completely cancelled out due to the difference in the tensile stresses of the first and second reinforcement layers 27 and 28 can be canceled out by the compressive stress of the adhesion suppression layer 29. Further, the adhesion suppression layer 29 having tensile stress as internal stress may be provided on one of the first and second reinforcement layers 27 and 28, which has lower tensile stress. This is because the compressive stress generated by the difference in the tensile stresses of the first and second reinforcement layers 27 and 28 can be canceled out by the tensile stress of the adhesion suppression layer 29.

The average thickness of the adhesion suppression layer 29 is favorably not less than 1 nm and not more than 100 nm, more favorably not less than 2 nm and not more than 25 nm, and still more favorably not less than 2 nm and not more than 20 nm. In the case where the average thickness of the adhesion suppression layer 29 is not less than 1 nm, it is possible to suppress the reduction in function as the adhesion suppression layer 29 due to the average thickness of the adhesion suppression layer 29 being too small. Meanwhile, in the case where the average thickness of the adhesion suppression layer 29 is not more than 100 nm, it is possible to suppress the average thickness of the adhesion suppression layer 29 being too large, i.e., the internal stress of the adhesion suppression layer 29 being too high. The average thickness of the adhesion suppression layer 29 is obtained in the same way as that of the above-mentioned method of calculating the average thickness δ of the recording layer 23.

In the case where an average thickness of D2 of the second reinforcement layer 28 is not less than 75 nm and not more than 300 nm, a ratio (D4/D2) of an average thickness D4 of the adhesion suppression layer 29 to the average thickness of D2 of the second reinforcement layer 28 is favorably not less than 0.005 and not more than 0.35. In the case where the ratio (D4/D2) is not less than 0.005, it is possible to suppress the reduction in function as the adhesion suppression layer 29 due to the average thickness D4 of the adhesion suppression layer 29 being too small with respect to the average thickness of D2 of the second reinforcement layer 28. Meanwhile, in the case where the ratio (D4/D2) is not more than 0.35, it is possible to suppress the average thickness D4 of the adhesion suppression layer 29 being too large with respect to the average thickness of D2 of the second reinforcement layer 28, i.e., the compressive stress of the adhesion suppression layer 29 being too high with respect to the tensile stress of the second reinforcement layer 28. Therefore, it is possible to further suppress occurrence of cupping.

The adhesion suppression layer 29 contains, for example, at least one of carbon and a metal oxide. The adhesion suppression layer 29 is favorably a carbon thin film containing carbon as a main component or a metal oxide film containing a metal oxide as a main component. The carbon is favorably diamond-like carbon (hereinafter, referred to as "DLC"). The metal oxide favorably contains at least one of aluminum oxide, copper oxide, and cobalt oxide. The adhesion suppression layer 29 may be, for example, a CVD film formed by a chemical vapor deposition (CVD) method or a sputtering film formed by a sputtering method.

The adhesion suppression layer 29 favorably has a laminated structure of two or more layers. This is because the dimension stability of the magnetic recording medium can be further improved. Note that the principle thereof is similar to that in the case where the reinforcement layer 25 has a laminated structure of two or more layers in Modified Example 3. In the case where the adhesion suppression layer 29 has a laminated structure of two or more layers, the materials of each layer may be the same or different.

In the magnetic recording medium having the above-mentioned configuration, since the internal stresses (tensile stresses) of the first and second reinforcement layers 27 and 28 are cancelled out each other, it is possible to suppress occurrence of cupping in the magnetic recording medium. Therefore, it is possible to maintain the favorable contact state between the magnetic head and the magnetic recording medium, and provide a high SN magnetic recording medium having high dimension stability in the track width direction and excellent off-track characteristics. Further, when the laminate 20 is wound into a roll in the step of producing the magnetic recording medium, since the adhesion suppression layer 29 is interposed between the first and second reinforcement layers 27 and 28, it is possible to suppress metal adhesion of the first and second reinforcement layers 27 and 28.

EXAMPLE

Hereinafter, the present technology will be specifically described by way of Examples. However, the present technology is not limited to only these Examples.

i Examples and Comparative Examples Regarding Magnetic Powder

Example 1

(Synthesis of $Fe_3O_4$ Nanoparticle)

Figure 12:
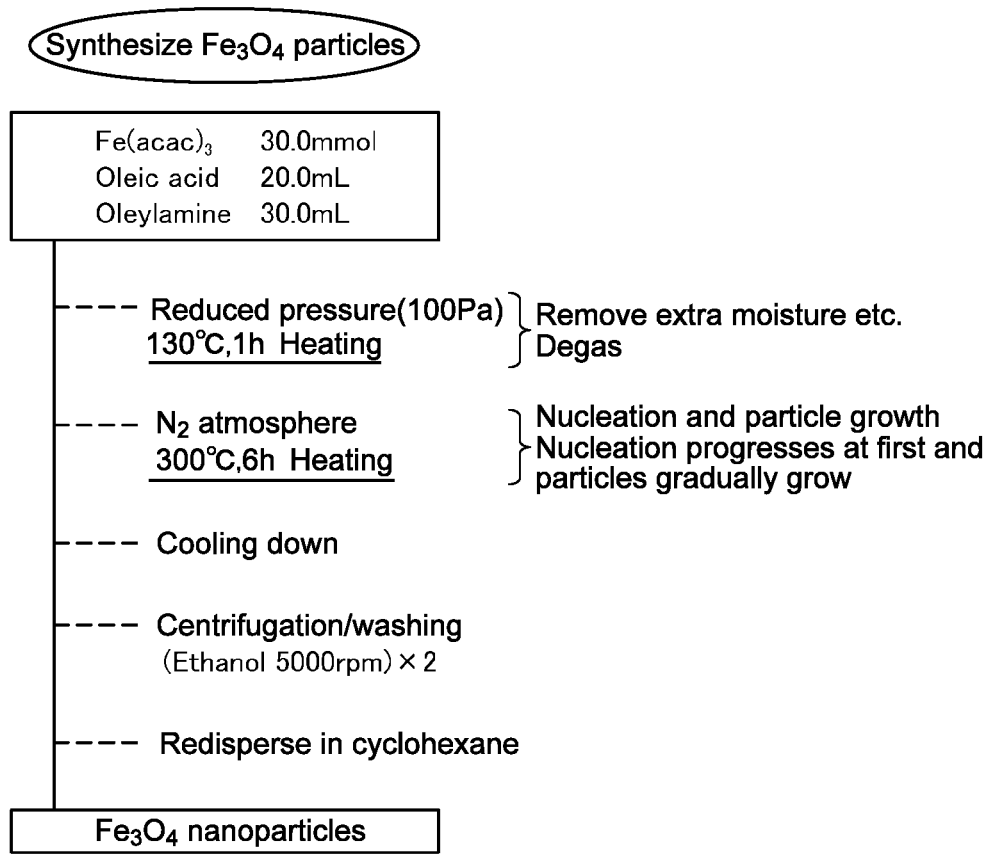
FIG. 12 is a process chart for describing a step of synthesizing Fe$_3$O$_4$ nanoparticles.

FIG. 12 shows the outline of a step of synthesizing $Fe_3O_4$ nanoparticles as precursor particles. First, 30.0 mmol of iron acetylacetonate, 20.0 mL of oleic acid, and 30.0 mL of oleylamine were weighed in a 300 ml round-bottomed three-necked flask and mixed to prepare a solution. Next, degassing treatment was performed on the solution by heating it at 130° C. for one hour under a reduced pressure atmosphere of 100 Pa.

Next, the atmosphere was switched to an $N_2$ atmosphere, the temperature was increased to 300° C., and heating was performed for six hours. After that, it was naturally cooled to room temperature, and centrifuged and washed a plurality of times with ethanol to obtain $Fe_3O_4$ nanoparticles as precursor particles. Finally, the obtained $Fe_3O_4$ nanoparticles were redispersed in cyclohexane.

(Silica Coating Treatment)

Figure 13:
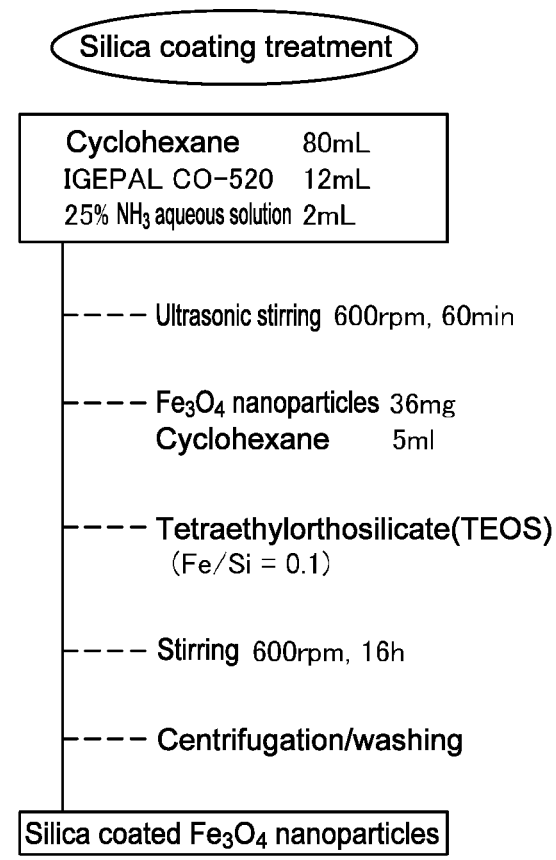
FIG. 13 is a process chart for describing a silica coating treatment step.

FIG. 13 shows the outline of a silica coating treatment step. First, 80 mL of cyclohexane, 12 mL of polyoxyethylene (δ) nonylphenyl ether (IGEPAL (registered trademark)), and 2 mL of aqueous ammonia were mixed in a 100 ml eggplant flask, and stirred at 600 rpm for 60 min while applying ultrasonic waves until a transparent uniform solution was obtained.

The $Fe_3O_4$ nanoparticles previously dispersed in cyclohexane were added thereto, and tetraethylorthosilicate was added dropwise at an arbitrary rate so that the molar ratio of Fe/Si was 0.1. After the dropwise addition, stirring was further continued at 600 rpm for 16 hours. After completion of the reaction, the work of adding methanol and performing centrifugation was repeated a plurality of times to perform washing. The precipitate obtained by the centrifugation was dried in a dryer at 60° C., and silica coated $Fe_3O_4$ nanoparticles were collected.

(High-Temperature Heat Treatment)

First, the obtained silica coated $Fe_3O_4$ nanoparticles were put in an alumina crucible and, the crucible was placed in a muffle furnace. After that, the muffle furnace was heated to 1100° C., and firing was performed for 200 hours. As a result, a powder of s-iron oxide nanoparticles in a substantially single phase was obtained.

(Silica Coating Removal)

Figure 14:
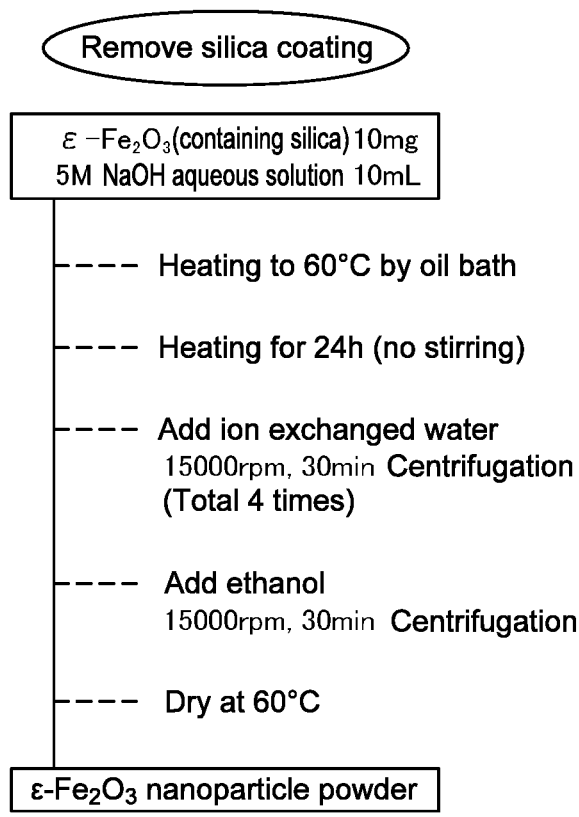
FIG. 14 is a process chart for describing a silica coating removal step.

FIG. 14 shows the outline of a silica coating removal step. First, a powder of the ε-iron oxide nanoparticles and an aqueous NaOH solution adjusted to 5 M were put in a Teflon centrifuge tube, heated to 60° C. by an oil bath, and left to stand for 24 hours. After that, the work of adding ion exchange water and performing centrifugation was repeated a plurality of times. Further, ethanol was added thereto, and it was centrifuged and then dried at 60° C. to obtain a powder of ε-iron oxide nanoparticles from which silica coating had been removed.

Reference Example 1

A powder of ε-iron oxide nanoparticles was obtained in the same way as that in Example 1 except that FeO nanoparticles are synthesized instead of $Fe_3O_4$ nanoparticles as precursor particles. The step of synthesizing FeO nanoparticles will be described below.

(Synthesis of FeO Nanoparticle)

Figure 15:
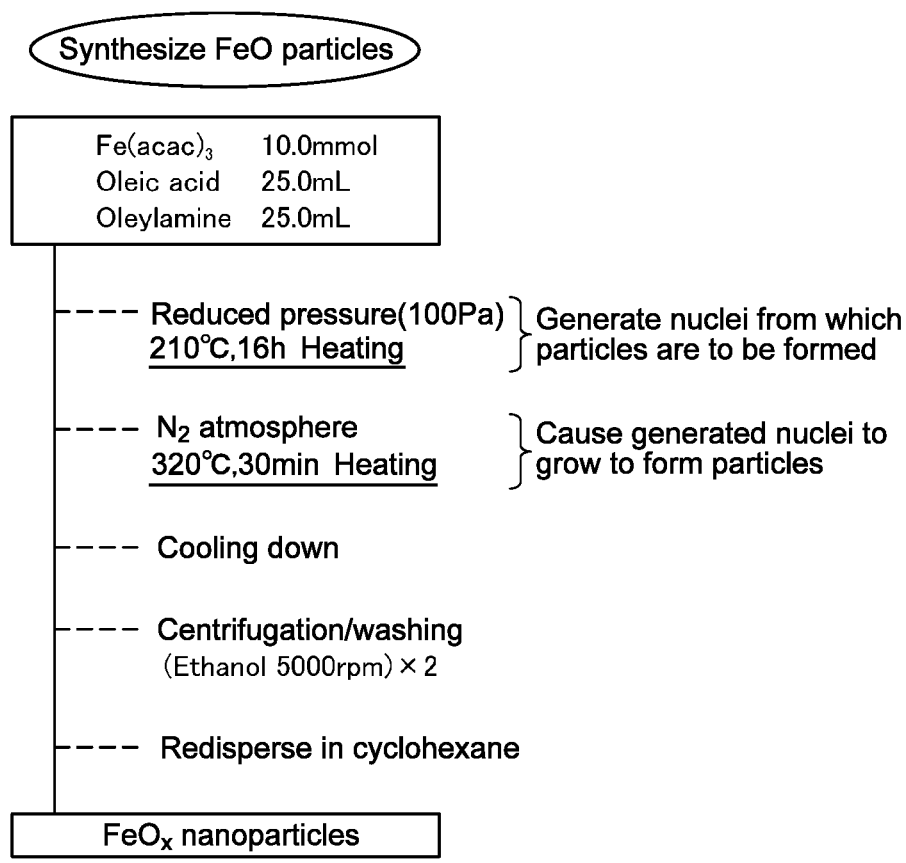
FIG. 15 is a process chart for describing a step of synthesizing FeO nanoparticles.

FIG. 15 shows the outline of the step of synthesizing FeO nanoparticles. First, 10 mmol of iron acetylacetonate, 25.0 mL of oleic acid, and 25.0 mL of oleylamine were weighed in a 300 ml round-bottomed three-necked flask and pretreated by heating at 210° C. for 16 hours under a reduced pressure atmosphere of 100 Pa.

Next, the atmosphere was switched to an $N_2$ atmosphere, the temperature was increased to 320° C., and heating was performed for 30 min. After that, it was naturally cooled to room temperature, and centrifuged and washed a plurality of times with ethanol to obtain FeO nanoparticles. Finally, the obtained FeO nanoparticles were redispersed in cyclohexane.

Reference Example 2

A powder of ε-iron oxide nanoparticles was obtained in the same way as that in Example 1 except that the time for pre-treatment with heating in the step of synthesizing FeO nanoparticles is set to 24 hours.

Reference Example 3

A powder of ε-iron oxide nanoparticles was obtained in the same way as that in Reference Example 1 except that the time for pre-treatment with heating in the step of synthesizing FeO nanoparticles is set to 32 hours.

Comparative Example 1

By the method described in Non-Patent Literature 1, ε-iron oxide nanoparticles were prepared. That is, iron hydroxide-based compound particles were prepared by a reverse micelle method, silica coating was applied to the particles, and then heat treatment was performed to obtain a powder of ε-iron oxide nanoparticles.

Comparative Example 2

By the method described in Patent Literature 1, ε-iron oxide nanoparticles were prepared. That is, iron oxyhydroxide (α-FeOOH) was used as a raw material powder to obtain a powder of ε-iron oxide nanoparticles.

Table 1 shows the production conditions and the like of the magnetic powders according to Example 1, Reference Examples 1 to 3, and Comparative Examples 1 and 2.

TABLE 1

|  | Magnetic powder precursor | Precursor synthesis method | Precursor particle nucleation time (h) | Precursor particle synthesis time (h) | Average particle size (nm) |
|---|---|---|---|---|---|
| Example 1 | $Fe_3O_4$ | Vacuum liquid-phase thermal decomposition method | — | 7 | 16 |
| Reference Example 1 | FeO | Vacuum liquid-phase thermal decomposition method | 16 | 16.5 | 59.5 |
| Reference Example 2 | FeO | Vacuum liquid-phase thermal decomposition method | 24 | 24.5 | 40.9 |
| Reference Example 3 | FeO | Vacuum liquid-phase thermal decomposition method | 32 | 32.5 | 23.6 |
| Comparative Example 1 | Iron hydroxide | Reverse micelle method | — | — | 16.8 |
| Comparative Example 2 | Iron oxyhydroxide | — | — | — | 16.8 |

[Average Particle Size]

The average particle size of each of the magnetic powders according to Example 1, Reference Examples 1 to 3, and Comparative Examples 1 and 2 obtained as described above was obtained by the above-mentioned method described in the first embodiment.

[Evaluation of Coefficient of Variation]

The coefficient of variation of each of the magnetic powders according to Example 1, Reference Examples 1 to 3, and Comparative Examples 1 and 2 obtained as described above was obtained by the above-mentioned method described in the first embodiment. As a result, it was found that the coefficient of variation of each of the powders of ε-iron oxide nanoparticles according to Example 1 and Reference Examples 1 to 3 was smaller than the coefficient of variation of each of the powders of ε-iron oxide nanoparticles according to Comparative Examples 1 and 2. That is, it was found that variation in ε-iron oxide nanoparticles could be suppressed by the method of producing each of the powders of ε-iron oxide nanoparticles according to Example 1 and Reference Examples 1 to 3 as compared with the methods of producing the powders of ε-iron oxide nanoparticles according to Comparative Examples 1 and 2.

[Evaluation of Synthesis Time of Precursor Particles]

Figure 16:
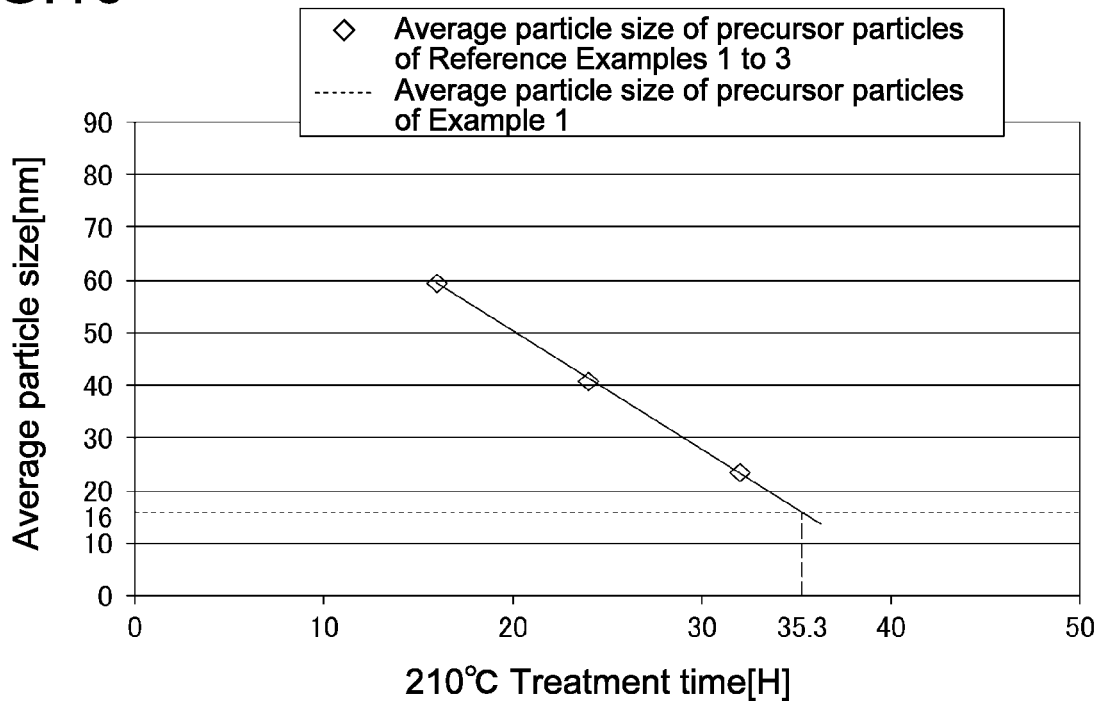
FIG. 16 is a graph showing a relationship between generation time of nuclei as the basis of precursor particles (FeO nanoparticles) and an average particle size of the precursor particles.

FIG. 16 shows the relationship between generation time of nuclei as the basis of precursor particles (FeO nanoparticles) according to Reference Examples 1 to 3 and an average particle size of the precursor particles. Further, in FIG. 16, also the average particle size of the precursor particles ($Fe_3O_4$ nanoparticles) according to Example 1 is shown for comparison. Note that the average size of the precursor particles is a value obtained in the same way as that of the average particle size of the powder of ε-iron oxide nanoparticles.

From the approximate straight line in FIG. 16, it can be seen that in the case of each of the methods of synthesizing the precursor particles according to Reference Examples 1 to 3, it takes approximately 35 hours to synthesize precursor particles of 16 nm. Meanwhile, from FIG. 12, it can be seen that in the case of synthesizing precursor particles according to Example 1, it takes only 7 hours to synthesize precursor particles of 16 nm. Therefore, the method of producing the powder of ε-iron oxide nanoparticles according to Example 1 is capable of improving the productivity of ε-iron oxide nanoparticles as compared with the methods of producing the powders of ε-iron oxide nanoparticles according to Reference Examples 1 to 3.

Although embodiments and Examples of the present technology have been specifically described above, the present technology is not limited to the above-mentioned embodiments and Examples and various modifications can be made on the basis of the technical idea of the present technology.

For example, the configurations, the methods, the steps, the shapes, the materials, and the numerical values cited in the above-mentioned embodiments and Examples are only illustrative, and different configurations, methods, steps, shapes, materials, and numerical values may be used as necessary.

Further, the configurations, the methods, the steps, the shapes, the materials, and the numerical values in the above-mentioned embodiments and Examples can be combined without departing from the essence of the present disclosure.

Further, the present technology may take the following configurations.

(1)
A method of producing a magnetic powder, including:
performing heat treatment on first particles that contain triiron tetraoxide to prepare second particles that contain ε-iron oxide.

(2)
The method of producing the magnetic powder according to (1), further including
performing reduction treatment on the second particles.

(3)
The method of producing the magnetic powder according to (2), further including
performing oxidation treatment on the second particles on which the reduction treatment has been performed.

(4)
The method of producing the magnetic powder according to any one of (1) to (3), further including:
performing silica coating treatment on the first particles before the heat treatment; and
removing silica coating on the second particles after the heat treatment.

(5)
The method of producing the magnetic powder according to any one of (1) to (4), in which
an average particle size of the first particles is not less than 8 nm and not more than 25 nm.

(6)
The method of producing the magnetic powder according to any one of (1) to (5), further including
preparing the first particles by a liquid-phase thermal decomposition method before the heat treatment.

(7)
The method of producing the magnetic powder according to (6), in which
the preparing the first particles by a liquid-phase thermal decomposition method includes preparing the first particles by performing heat treatment after performing degassing treatment on a solution containing iron acetylacetonate.

(8)
A method of producing a magnetic recording medium, including:
performing heat treatment on first particles that contain triiron tetraoxide to prepare second particles that contain ε-iron oxide; and
forming a recording layer by using the prepared second particles.

(9)
A magnetic powder, including:
particles containing ε-iron oxide, in which
a coefficient of variation represented by the following formula (1) is not more than 30%, and
a ratio Y/X of a sub-peak height Y near a zero magnetic field to a main peak height X in an SFD (Switching Field Distribution) curve is not more than 0.5.

Coefficient of variation[%]=([Standard deviation of particle diameter]/[Average particle diameter])× 100     (1)

(10)
The magnetic powder according to (9), in which
each of the particles includes
a core portion containing ε-iron oxide, and
a shell portion containing α-Fe.

(11)
The magnetic powder according to (9), in which
each of the particles includes
a core portion containing ε-iron oxide,
a first shell portion containing α-Fe, and
a second shell portion that is provided on the first shell portion and contains iron oxide.

(12)
The magnetic powder according to any one of (9) to (11), in which
each of the particles further contains metal other than iron.

(13)
A magnetic recording medium, including:
a recording layer that includes particles containing ε-iron oxide, in which
δ/Mrt satisfies a relationship represented by the following formula (2), and
a ratio Y/X of a sub-peak height Y near a zero magnetic field to a main peak height X in an SFD (Switching Field Distribution) curve is not more than 0.5.

$$2.0 \le \delta/Mrt \le 120.0 \quad (2)$$

(in which δ [nm] is an average thickness of the recording layer and Mrt [mA] is a product of a residual magnetization amount and a thickness of the recording layer.)

(14)
The magnetic recording medium according to (13), in which
a squareness ratio in a direction perpendicular to the recording layer is not less than 60%.

REFERENCE SIGNS LIST

11 ε-iron oxide particles (second particles)
11a Fe$_3$O$_4$ particles (first particles)
12 core portion
13, 14 shell portion
14a first shell portion
14b second shell portion
21 substrate
22 underlayer
23 recording layer
24 backcoat layer It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A method of producing a magnetic powder, comprising:
preparing a plurality of first particles by a liquid-phase thermal decomposition method, wherein the first particles include triiron tetraoxide, and wherein the first particles have an average particle size from 8 nm to 25 nm;
performing silica coating treatment on the first particles;
performing heat treatment on the first particles to prepare a plurality of second particles that contain ε-iron oxide with an average particle size of the second particles from 8 nm to 25 nm; and
removing silica coating on the second particles after heat treatment.

2. The method of producing the magnetic powder according to claim 1, further comprising performing reduction treatment on a surface of the second particles.

3. The method of producing the magnetic powder according to claim 2, further comprising performing oxidation treatment on an outer surface of the second particles on which the reduction treatment has been performed on the surface of the second particles.

4. The method of producing the magnetic powder according to claim 1, wherein the preparing the first particles by the liquid-phase thermal decomposition method includes preparing the first particles by performing heat treatment after performing degassing treatment on a solution containing iron acetylacetonate.

5. A method of producing a magnetic recording medium, comprising:

preparing a plurality of first particles by a liquid-phase thermal decomposition method, wherein the first particles include triiron tetraoxide, and wherein the first particles have an average particle size from 8 nm to 25 nm;

performing silica coating treatment on the first particles;

performing heat treatment on the first particles to prepare a plurality of second particles that contain ε-iron oxide with an average particle size of the second particles from 8 nm to 25 nm;

removing silica coating on the second particles after heat treatment and forming a recording layer by using the prepared second particles.

6. The method of producing the magnetic recording medium according to claim 5, further comprising performing reduction treatment on a surface of the second particles.

7. The method of producing the magnetic recording medium according to claim 6, further comprising performing oxidation treatment on an outer surface of the second particles on which the reduction treatment has been performed on the surface of the second particles.

8. The method of producing the magnetic recording medium according to claim 5, wherein the preparing the first particles by the liquid-phase thermal decomposition method includes preparing the first particles by performing heat treatment after performing degassing treatment on a solution containing iron acetylacetonate.

* * * * *